3,329,572
PROCESS FOR TREATING ANIMAL TISSUES AND PRODUCT
Guy L. J. Malgouzou, 22 Rue de l'Est, Berck-Plage, Pas-de-Calais, France
No Drawing. Filed Feb. 18, 1964, Ser. No. 345,748
Claims priority, application France, Feb. 21, 1963, 925,586, 925,587
20 Claims. (Cl. 167—74)

This invention relates to the treatment of animal tissues, particularly with a view to the separation of acidic polysaccharides.

More specifically, it is an object of this invention to obtain polysaccharides free from any proteins and mineral salts which may be present along therewith.

According to a feature of this process, an animal tissue is treated with an alkaline aqueous solution of ethylenediaminotetracetic acid (EDTA), the liquid phase or crude extract is separated, the said extract is then treated with a cationic resin IR 50, in its form XE 64, at a pH of about 5, in order to remove the major part of the proteins, from the extract, and the partially deproteinized extract is treated with a quaternary ammonium compound capable of precipitating the acidic polysaccharides. This resin is fully described in the Journal of the Society of Cosmetic Chemists, vol. XIII, No. 6, August 1962 in an article by Robert W. Percival. The resin is stated to be a high molecular weight insoluble co-polymer of the weakly acidic carboxylic type, cation exchange resin.

It has been found that the treatment with the disodic salt of EDTA results in a solubilization of the acidic polysaccharides present in the initial tissue.

When the latter is an osseous or cartilaginous tissue, the disodic salt of EDTA exerts moreover its known decalcifying action, in addition to a solubilizing action on collagen proteins and on the chondroitin sulfuric acid contained in cartilage.

The alkaline aqueous solution of EDTA is preferably prepared from the disodic salt of the acid, which has the advantage of being directly soluble in water whereas the acid is not, and of being much cheaper. For the best result, it is preferred to use the disodic salt in the form of the saturated aqueous solution thereof and to adjust the pH to about 8.6 by the addition of sodium hydroxide, for instance NaOH 2 N.

It is advantageous to bring about the greatest amount of contact surface between the tissue and the treatment solution, therefore to employ the tissue in a finely divided form. While they are maintained in contact, which may last for about 12 hours, it is recommended to keep stirring the powdered tissue in the treatment liquid.

Before treating with the cationic resin, it is of interest to leave the alkaline extract, separated from the tissue, standing, so that the hydrolytic action may go on, preferably for a period of about 24 hours.

Before the extract is left standing and in order to eliminate from the tissue all the soluble constituents thereof, it is of interest to separate the powder from the liquid containing EDTA and to wash it for a prolonged period of time (about 12 hours) with an aqueous solution of sodium hydroxide, particularly a 4 percent solution of NaOH 2 N, and to add the washings to the alkaline extract, with a view to leaving the whole standing.

For these steps of treatment with EDTA, washing and standing, one may operate at temperatures ranging from a few degrees above 0° C. to normal ambient temperature, that is about 20° C.; there is an advantage in operating at the lower temperatures of said range, for instance at 4° or 5° C.

In the second chief step in carrying this invention into effect, use is made of the property, exhibited by the cationic resins IR 50 in their form XE 64, to fix proteins when they are equilibrated with an acetate buffer solution at a pH of about 5. At this pH value, the capacity of these resins is of the order of 30 mg. of proteins for each gram of dry resins, the fixation taking place without any exchange of ions. The resins act as portein traps and make it possible, by simple decantation, to separate polysaccharides, disodic salt of EDTA and electrolytes (liquid phase) from proteins (solid phase).

The percentage of proteins in the crude extract is estimated and, on the basis of that value, the amount of resins IR 50 is determined to be used. In practice, with a view to obtaining a good result, an amount exceeding by about 50% the theoretically required quantity is employed.

The pH of the crude extract may be brought to 5.5 by means of acetic acid, after which about the half of the amount of resins judged necessary is added. After stirring vigorously for one hour, the resins are decanted, for example by filtering through a sintered glass plate.

The filtrate is then treated with the remaining resins and, at the end of an hour, one filters again.

The following step in the treatment of the crude extract partially deproteinized by the action of the IR 50 resin is the treatment with a quaternary ammonium compound. It is within the scope of this invention to operate in the reverse order, namely to treat first with the quaternary ammonium compound then to deproteinize on a resin, but the first method is simpler and preferred.

As quaternary ammonium compounds, one generally employs compounds containing an aliphatic chain having at least 12 carbon atoms, preferably 14 or more. Such compounds are, for example, cetylpyridinium chloride, trimethyl-hexadecyl-ammonium bromide or Cetiminium (trademark "Cetavlon"), [1 - (p - methyl phenyl) tetradecyl] trimethyl ammonium sulfomethosulfate (trademark "Desogen") and (diisobutyl-phenoxyethoxy-ethyl) dimethyl benzyl ammonium chloride trademark "Hyamine"). A further example is benzidine hydrochloride, this compound being functionally to be likened to the said quaternary compound.

The amount of quaternary ammonium compound required to insure the flocculation of the acidic polysaccharides depends upon the nature of this compound as well as on that of the ions present in the solution, and it appears to be governed by very complex laws. It is therefore recommended, in practice, to determine the amount to be employed by preliminary trials. Here again, it is possible to operate at the temperatures indicated above, most conveniently at room temperature, but working at the lower temperatures of the range, i.e. about 4° C., makes precipitation easier.

In order to purify the precipitate of quaternary ammonium compound and of polysaccharides, particularly to complete the removal of proteins, it is advantageous to separate said precipitate, redissolve it, then precipitate it again, preferably several times, with intercurrent dryings (for instance, with ether). It is possible, in particular, to dissolve again the initial precipitate, after separation, by exchanging the ammonium ions in an aqueous medium with sodium or calcium ions. The most convenient method involves the use of an aqueous solution of sodium chloride, but one may also use, for instance, an aqueous solution of calcium chloride. For reprecipitation, a lower aliphatic alcohol, such as ethanol or butanol, may be used. In practice, ethanol is preferred because of its cheapness and of its relatively low boiling point. It is also possible to begin by adding such an alcohol to the solution in which the precipitation was effected in order to dissolve the initial precipitate, and then to add sodium or calcium ions for reprecipitation.

Finally one obtains a white powder, very soluble in water, which gives a clear, viscous solution of acidic mucopolysaccharides.

In the case where osseous tissues are treated, it is also possible to recover the proteins in the form of a solution of amino acids and short chain peptides along with the isolation of polysaccharides.

In this case, according to a feature of this invention, after the treatment of decalcification and solubilization by EDTA, the acidic polysaccharidic fraction is separated from the proteins. The latter are hydrolyzed separately to transform them into amino acids and short-chain polypeptides so that this hydrolysis does not degrade the polysaccharidic fraction, as would happen if it were conducted in the presence of the fraction.

Thus, in particular, it is possible to start with the skeleton of a mammalian foetus having reached the middle of its foetal life (calf of 4 months). Its conservation at low temperature facilitates the separation of the soft tissues from the skeleton. The later will be as far as possible freed from any shreds of soft tissues that may adhere to the bone.

One may use the skeleton of any other mammalian provided that this animal does not carry a Forsmann antigen.

In order to treat more efficiently the bones and cartilages, for instance of a mammalian skeleton, it is of advantage to reduce it to minute fragments. This may be effected by plain grinding or also by dipping into liquid air, as a consequence of which the bones and cartilages become very friable and can then be reduced, through grinding, to much finer particles.

In order to free the particles thus obtained from the blood serum and the hemoglobin they contain by very large amounts, one may wash then with distilled water containing an antiseptic agent, for instance sodium mercurothiolate in an amount of 0.01%, until the effluent does not anymore present a coloration visible to the eye.

In practice, it is desirable to submit the particles washed in that manner to a freeze-drying treatment, since this operation presents some capital advantages, namely:

(1) Possibility of storing and preserving the starting material, which enables to spread the production over the entire year:

(2) Easy pulverization of the dry preparation by means of a ball mill; after a few minutes, one gets an impalpable powder; the latter is an ideal material for a quantitatively and qualitatively interesting extraction.

For 100 grams of bones and cartilages ground and washed, this operation yields about 33 grams of dry powder.

Thus one may operate afterwards in the following manner:

The bone and cartilage powder is treated with an aqueous solution of the disodic salt of EDTA. It has been found that the said salt, besides its well known decalcifying action, exerts an effect of solubilization on some collagen proteins and on the chondroitin-sulfuric acid contained in the cartilage.

During the contact effected according to the conditions described above, the duration of which may be of about 12 hours, it is recommended to stir the tissue powder continuously in the treatment liquid.

The following step of the process is the treatment of the liquid phase or crude extract with a resin IR 50 in its form XE 64, at a pH of about 5 but, before so doing, it is advantageous to leave the alkaline extract, separated from the tissue, standing so that the hydrolytic action may go on, preferably for a period of time in the order of 24 hours.

It is then possible to carry out the washing and maturation in the way described above.

The set of operations of treating the powder with EDTA, washing with a solution of sodium hydroxide, and allowing to stand, solubilizes only a part of the bone and cartilage proteins, but it sets free the total amount of acidic polysaccharides. The first extract thus obtained (crude extract) contains proteins, glycoproteins and neutral polysaccharides; there is also found a minor amount of polysaccharides showing a heparine-like activity, the electrophoretic mobility of the same being notably higher than the mobility of the acidic polysaccharides.

The separation of the major portion of the proteins contained in the crude extract is then carried out, using the resin IR 50 preferably in two steps, as described hereabove.

The two batches of resins, collected after the said treatment, are then combined, rinsed with an acetate buffer at pH 5.5, after which they are suspended again in water.

The pH of this solution is then adjusted to a value of 10.5 by means of sodium hydroxide and, after filtration, the proteins are eluted from their support. Finally, the resins are rinsed with water containing 10% of a 2 N aqueous solution of sodium hydroxide.

Thus the almost total amount of the proteins dissolved in the crude extract is recovered and one obtains what which will be termed "purified protein extract."

In order to transform the proteins present in a large amount in the proteinic extract into amino acids and short-chain polypeptides, one may use any acidic or enzymatic digestion process.

Particularly, it is possible to carry out first a preliminary hydrolysis by means of papain, then a second hydrolysis by means of trypsin, to eliminate the insoluble residue and to purify the hydrolysis product by passage on Amberlite resin IR 120 or IR 50 in their H form, according to the principle of transfer chromatography described by Partridge and Brimley, with a 4 N aqueous solution of ammonia as the transferring agent.

The following example is intended to illustrate the present invention:

EXAMPLE

In a first step, 100 g. of dry powder of bones and cartilages were treated with 1000 ml. of water containing 110 grams of the disodic salt of EDTA and the pH of the solution is adjusted to 8.6 by means of a 2 N solution of sodium hydroxide. The whole was then submitted to vigorous stirring for a period of 12 hours at room temperature.

After recovering the insoluble phase, the latter was washed for a period of 12 hours with 1000 ml. of water containing 40 ml. of 2N NaOH. The two extracts were combined and constituted the crude extract, the volume thereof being of about 2 litres.

Before going on, the extract was left standing for 24 hours so as to determine a partial alkaline hydrolysis. An estimation of the proteinic content according to Lowry's method (tyrosin index) gave a result of about 1500 $\gamma$/ml.

The weight of the wet insoluble residue was in the neighbourhood of 200 g.

The pH of the crude extract was adjusted to 5.0 by means of acetic acid.

An amount of 200 g. of Amberlite resin IR 50 in its form XE 64, buffered at pH 5 by means of a Sorensen type acetate buffer was added. After vigorous stirring for an hour, the resins were separated on a sintered plate No. 2 (AFNOR Pyrex specification).

In the crude extract so treated, there was still present an amount of proteins in the order of 600 $\gamma$/ml.

200 g. of resin IR 50, buffered at pH 5, were then added and the precedent operation was repeated.

As a result of these two treatments, the amount of proteins in the crude extract sunk to 400 $\gamma$/ml.

The partially deproteinized crude extract (about 2 litres), the pH of which was of about 5, was taken back and completed to a volume of 3 litres by means of distilled water. The amount of Cetiminium necessary to provoke a total flocculation was determined. For that purpose, a series of 10 test-tubes each of which contained 10 ml. of the solution to be flocculated were employed. Using a dropping-tube, one drop of a 20% aqueous solution of Cetiminium was added in the first tube, 2 drops in the second one, 3 drops in the third one, and so on.

Generally flocculation occurred in the test-tube containing six drops. Knowing that one ml. of the 20% aqueous solution of Cetiminium contains 36 drops, it was concluded that 50 ml. of the said solution were necessary to obtain the desired result.

After shaking the mixture vigorously, the flocculate was allowed to settle and then collected by centrifuging. The wet weight of the precipitate was in the order of 35 g.

The said precipitate was then dissolved in 100 ml. of a 10% aqueous solution of sodium chloride. The dissolution took place rather slowly and required vigorous stirring.

The solution was clarified through centrifugation and the sediment set aside. A supernatant, opalescent and yellowish, slightly viscous liquid was obtained.

Polysaccharides were then precipitated by adding while stirring, 200 ml. of 95% by volume ethyl alcohol. The whole was allowed to settle and a whitish precipitate was obtained and collected by centrifuging.

The aforesaid precipitate was dehydrated by repeated washings with 50 ml. of 80% ethyl alcohol then of 95% ethyl alcohol and afterwards absolute ethyl alcohol; finally, the dehydration was completed by a last washing with 50 ml. of ethyl ether.

After evaporating the ether, there remained a white powder weighing about the tenth part of the initial wet weight, that is 3.50 g. This product was not yet pure and in particular contained proteins carried away during Cetiminium precipitation. In order to remove said proteins, the white powder obtained was dissolved in 50 ml. of a 0.8% aqueous solution of sodium chloride, to which had been added 2 ml. of pH 5 buffer. There occurred a very quick dissolution of the polysaccharides, whereas the proteins remained undissolved and were removed by centrifuging. The supernatant liquid was again treated with twice its volume of 95% alcohol in the presence of 10 ml. of a 10% aqueous solution of sodium chloride, then dehydrated as indicated above. Finally, 2 g. of dry product were obtained which, redissolved in water, gave a perfectly clear and translucent solution, showing a high degree of viscosity.

The batches of resin IR 50 were combined, rinsed with an acetate buffer at pH 5.5 and suspended in water. Sodium hydroxide was added to the aqueous suspension to raise the pH to 10.5, whereby the proteins were eluted from the resin into water thus yielding a protein extract; the resins were separated from the extract and rinsed with water containing 10% of a 2 N aqueous solution of sodium hydroxide, the washing water being then added to said protein extract.

Acetic acid was added to the protein extract to lower the pH thereof to 5.5, then the following mixture was added as many times as required.

Crude papain _____ g__ 1
EDTA disodic salt _____ g__ 0.90
Cystein hydrochloride _____ g__ 0.39
Acetate buffer to pH 5 _____ ml__ 50

The hydrolysis was carried out for a period of 36 hours at a pH of 5.5 and at a temperature of 60° C.

At the end of the said period, the pH was brought back to 7.2 by means of a 2 N solution of sodium hydroxide, and 400 mg. of "Pancrinase Choay" (source of trypsin) for every gram of papain employed were added.

This second step of hydrolysis was conducted for 24 hours at 37° C.

At the end of the two hydrolyses, there was left an insoluble deposit, which was discarded; in this way, I obtained a mixture of amino acids and polypeptides, which must be purified subsequently.

In addition to these amino acids and polypeptides, the mixture contained degradation products of enzymes and mineral salts resulting from previous treatments.

In order to free it from these impurities, I used Amberlite resins IR 120 in their H form, as has been stated herebefore, with a 4 N aqueous solution of ammonia as the transferring agent.

After evaporation of the ammonia from the eluate, I obtained an amber yellow hydrolysate, readily characterized by paper chromatography.

The solid residue from the treatment with EDTA was subjected to extraction by means of ethyl alcohol (80% by volume of ethanol) containing 5 percent by weight of potassium hydroxide, and the solid residue discarded, while the alcoholic extract was freed from potassium by passing carbon dioxide therethrough then filtered to leave a protein extract; the protein extract was treated with resin IR 50, the resin was eluted to yield a secondary protein aqueous extract as above described, and said secondary extract added to the above mentioned protein extract before the same is subjected to anzymatic digestion.

The 100 g. of dry bone powder treated according to the example finally yielded 150 ml. of hydrolysate (containing 9.75 g. of amino acids) and 2 g. of purified mucopolysaccharides.

Immediately prior to introduction into sealed vials, the two products thus obtained may be mixed together and the mixture made isotonic by adding 8 g. of sodium chloride to each litre thereof. After filtration, the mixture is put into vials, the amount being 5 ml. per vial, and subjected to freeze-drying for preservation purposes.

The main process steps are illustrated by the appended flowsheet.

The powder thus obtained, which presents a yellowish coloration, is more or less coherent, very soluble in water, insoluble in lower aliphatic alcohols, acetone and ether. Through dissolution of the powder in water, one obtains a liquid presenting the appearance and viscosity of blood serum, with a pH of about 7.0.

The freeze-dried powder thus put into 5 ml. sealed vials may be used for endovenous or deep intramuscular injection, after having been dissolved in 5 ml. of distilled water.

It is also possible, for surgical applications, to cause the product to be absorbed by a resorbable gelatin sponge and to dry the whole under reduced pressure. To this end, one impregnates sponges to saturation with the following composition:

Mucopolysaccharides _____ g__ 2
Hydrolysate _____ ml__ 50

The new medicament may be used in human therapeutics for the treatment of lesions of the osseous stroma, fractures, osteoporosis and arthritis. It is believed to exert its effect by supplying acidic polysaccharides that are necessary for the building of the organic ground substance of the bones. Moreover, the presence of proline and hydroxyproline gives a supply of amino acids essential to the synthesis of collagen. Presented for administration as indicated above, the medicament permits to avoid the hydrolytic destruction that would undergo a similar product administered perorally. Its presentation in the form of impregnated sponges makes it possible to bring directly in contact with the site of a fracture the elements required for the regeneration of the bone tissues.

This local application should preferably be completed by a parenteral administration of the product.

The surgical use of gelatin sponges depends upon the loss of osseous substance having occurred, the product purporting to make up that loss.

For parenteral administration, one may inject 1 vial daily, during the first 15 days of treatment, and later 1 vial every 3rd day.

It is possible to admix the product with any injectable aqueous solution or blood derivative for administration by perfusion.

The pharmacological activity of the product is believed to reside essentially in two processes, one being local and the other systemic.

(I) Local activity

The polysaccharides contained in the product exert a strong chemotrophic action on mesenchymatous elements and bring about a production of connective tissue at the point of implantation. Thus, by using the technique of Meir, Schuber and Desaulles (Experientia 6–469, 1950), it is possible to demonstrate the activity of the product by subcutaneous implantation, in the guinea-pig, of the product adsorbed on an inert carrier (gelatin sponge). In that way, I obtained the formation of a granuloma in 10 days whereas the implantation of the inert carrier alone gave a negative result.

In the domain of bone diseases, the local application of mucopolysaccharidic extracts brings about a very rapid formation of a callus if one includes mucopolysaccharides adsorbed on an inert carrier at the site of the fracture focus.

Carrying out Maurer's experiment (C.N.R.S., 1958), I effected, on the fore-leg of the rabbit, an intervention consisting in cutting, with a saw fitted with two parallel blades, a length of 4 mm. of the radius diaphysis.

In order to compensate for the loss of substance, a fragment of sponge impregnated with mucopolysaccharides was inserted. Once the wound stitched up, the evolution of bone reconstitution was followed by means of radiographies taken every 5th day.

In the controls, the mean value of consolidation time is of 85 days, whereas treated animals showed a radiological consolidation as early as the 60th day.

(II) Systemic activity

The majority of osteo-articular diseases result in a depolymerization of the acidic polysaccharides, with apparition in blood and urine of the compounds arising from this degradation. A notable raise of glycoproteins is observed almost always.

Thus, Kasavina and Zenkevitch (Clin. Chim. Acta., Holland, 1961—6—No. 6, pp. 874 to 882) describe the evolution of the level of acidic mucopolysaccharides in the fractures. Using the injectable form of the present medicament, I never observed in the rabbit any raise of the glycoproteins after intervention on the radius as described above. In the same way, a shortening of the bone gap was established. Radiological consolidation was obtained after a mean period of 70 days.

What I claim is:

1. In a process for the treatment of animal tissues with a view to separating acidic polysaccharides contained in said tissues, the steps of treating such a tissue with an aqueous alkaline solution of ethylene diamino tetracetic acid, separating the liquid phase from said tissue, treating said liquid phase by a high molecular weight insoluble co-polymer of the weakly acidic carboxylic type, cation exchange resin, at a pH of about 5 to remove the major part of proteins from said liquid phase and treating the liquid phase thus partly deproteinized by means of a quaternary ammonium compound for precipitating acidic polysaccharides.

2. The process of claim 1, said aqueous alkaline solution of ethylene diamino tetracetic acid being a saturated aqueous solution of the disodium salt of said acid which further contains an amount of sodium hydroxide effective to produce a pH of about 8.6.

3. The process of claim 1, the first step thereof comprising maintaining said tissue in finely divided condition in contact with said aqueous alkaline solution of ethylene diamino tetracetic acid for a period of about 12 hours.

4. The process of claim 1, which further comprises before the second and third step thereof, the step of leaving said liquid phase standing before treating the same with said cationic resin.

5. The process of claim 4, said liquid phase being left standing for about 24 hours.

6. The process of claim 1, which comprises washing said tissue after said liquid phase has been separated therefrom, with an aqueous solution of sodium hydroxide, and the liquid obtained from said washing step is mixed with said liquid phase.

7. The process of claim 6, the aqueous solution of sodium hydroxide being a 4 percent aqueous solution of 2 N caustic soda.

8. The process of claim 1, said cationic resin being employed in excess over the calculated amount required for the protein content in said liquid phase.

9. The process of claim 8, said excess amounting to about 50 percent by weight.

10. The process of claim 1, acetic acid being added to said liquid phase before said phase is treated with said cationic resin, by an amount effective to adjust the pH to about 5.

11. The process of claim 1, said quaternary ammonium compound is one which has an aliphatic chain containing not less than 12 carbon atoms.

12. The process of claim 1, said quaternary ammonium compound being trimethyl hexadecyl ammonium bromide.

13. In a process for the treatment of animal tissues with a view to separating acidic polysaccharides contained in said tissues, the steps of treating such a tissue with an aqueous alkaline solution of ethylene diamino tetracetic acid, separating the liquid phase from said tissue, treating said liquid phase by a high molecular weight insoluble co-polymer of the weakly acidic carboxylic type, cation exchange resin, at a pH of about 5 to remove the major part of proteins from said liquid phase, treating the liquid phase thus partly deproteinized by means of a quaternary ammonium compound having an aliphatic chain which contains not less than 12 carbon atoms, so as to obtain a precipitate of said quaternary ammonium compound and acidic polysaccharides, separating said precipitate, and purifying said precipitate by dissolution and precipitation.

14. The process of claim 13, the last step comprising dissolving said precipitate in an aqueous solution of a salt selected from the group consisting of sodium chloride and calcium chloride, and adding a lower aliphatic alcohol to the solution thus obtained.

15. The process of claim 1, comprising the additional steps of adding so much of a lower aliphatic alcohol to the liquid phase in which acidic polysaccharides have been precipitated as to redissolve the same, and then adding so much of an aqueous solution of a salt selected from the group consisting of sodium chloride and calcium chloride to reprecipitate said acidic polysaccharides.

16. The process of claim 1, wherein the starting tissue comprises osseous and cartilaginous tissues and ethylene diamino tetracetic acid is employed in such an amount as to decalcify said tissues and solubilize collagen proteins and chondroitin sulphuric acid contained in said tissues, in addition to solubilizing the acidic polysaccharides.

17. The process of claim 16 with the additional step of separating from said resin the proteins from said tissue which have been retained by said resin and subjecting the resins thus separated to acid enzymatic digestion.

18. A process which comprises grinding osseous and cartilaginous tissues of a mammal foetus to obtain a tissue powder, maintaining said tissue powder in contact with an aqueous alkaline solution of ethylene diamino tetracetic acid in such an amount as to decalcify said powder and also solubilize acidic polysaccharides, collagen proteins and chondroitin sulfuric acid contained therein; separating the liquid phase from the undissolved residual tissue powder; contacting said liquid phase with a high molecular weight insoluble co-polymer of the weakly acidic carboxylic type, cation exchange resin, at a pH of about 5 to cause the major part of proteins from said liquid phase to be retained on said resin; separating said resin thus laden with proteins; treating the liquid phase thus partly deproteinized by means of a quaternary ammonium compound to produce a precipitate; purifying said precipitate; separating from said resin the proteins retained thereby; subjecting said proteins to enzymatic acid digestion so as to obtain a protein hydrolysate; and mixing said purified precipitate and said protein hydrolysate.

19. An isotonic aqueous solution of the product obtained by the process of claim 18.

20. A resorbable sponge impregnated with the product obtained by the process of claim 18.

No references cited.

ALBERT T. MEYERS, *Primary Examiner.*

JULIAN S. LEVITT, *Examiner.*

M. J. COHEN, L. B. RANDALL, *Assistant Examiners.*